B. G. VAUGHAN.
MATCH SPLINT CONVEYING APPARATUS.
APPLICATION FILED JULY 19, 1913.
1,093,366.
Patented Apr. 14, 1914.
3 SHEETS—SHEET 2.
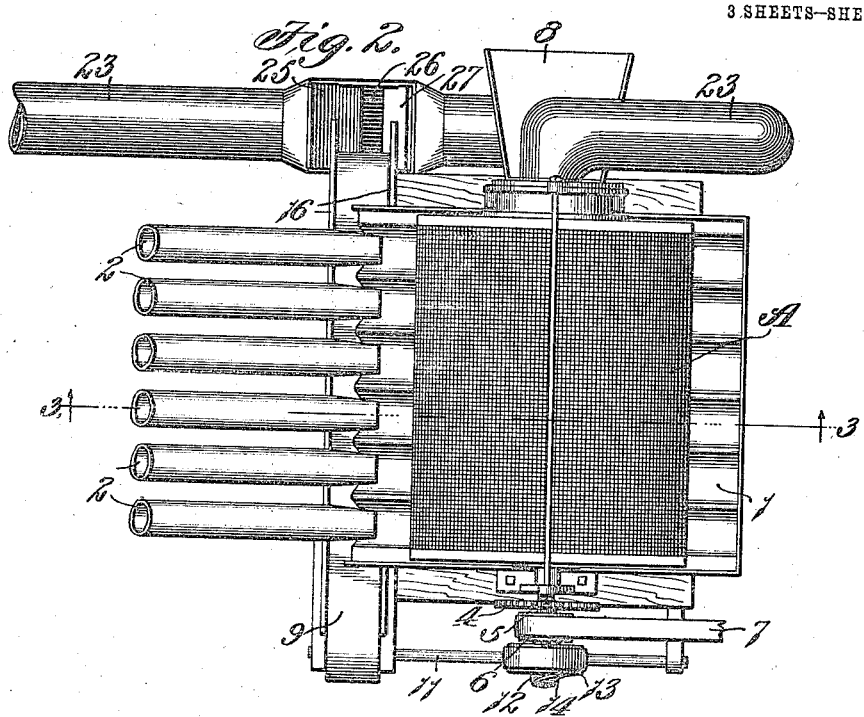
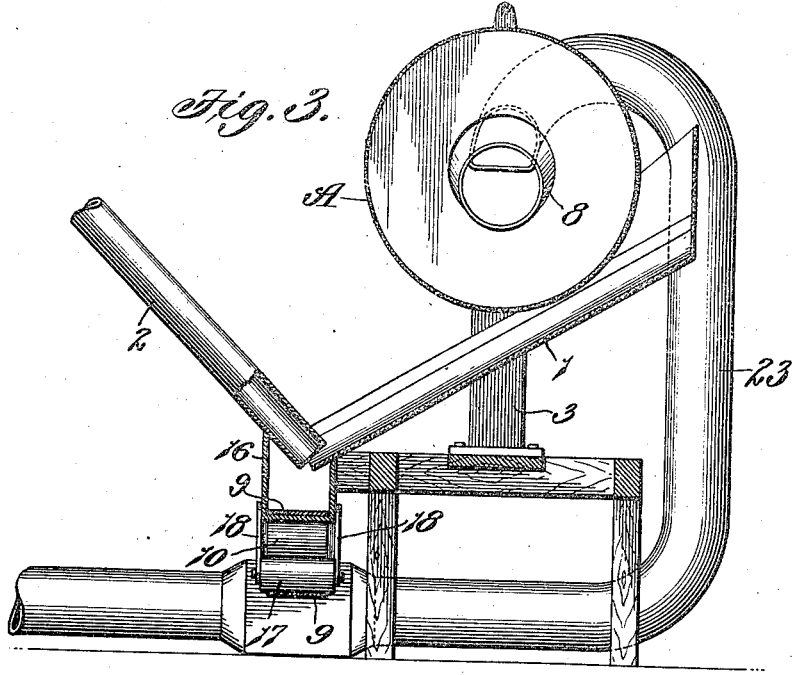

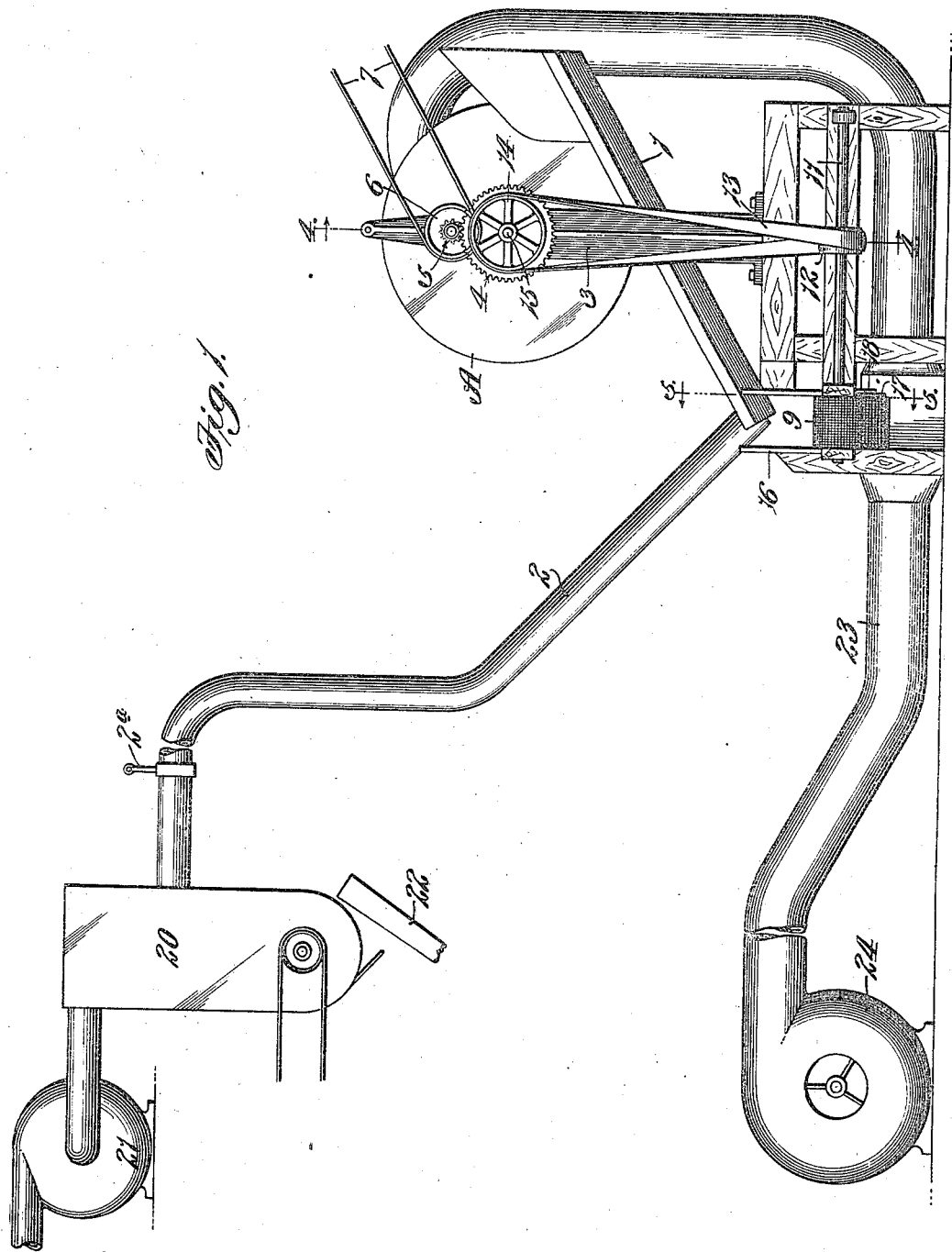

B. G. VAUGHAN.
MATCH SPLINT CONVEYING APPARATUS.
APPLICATION FILED JULY 19, 1913.
1,093,366.
Patented Apr. 14, 1914.
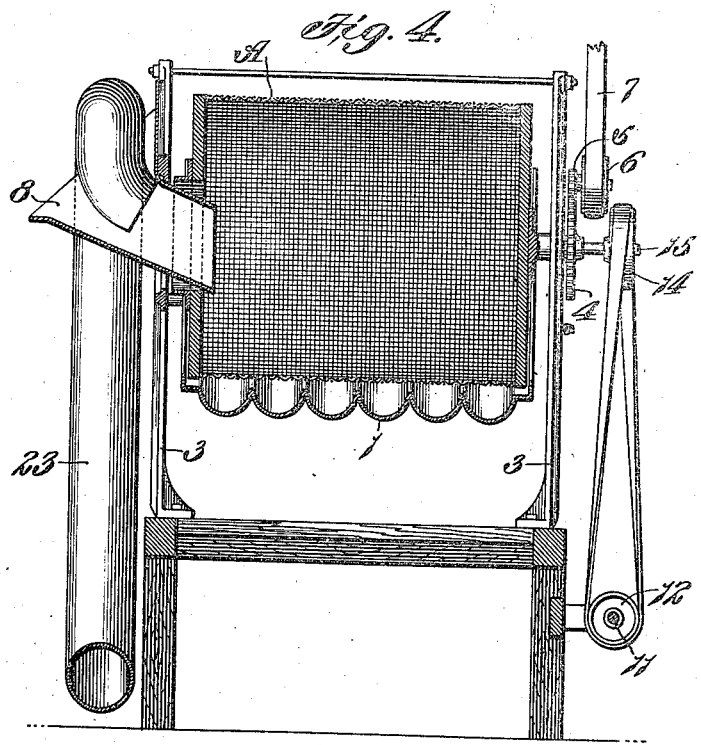
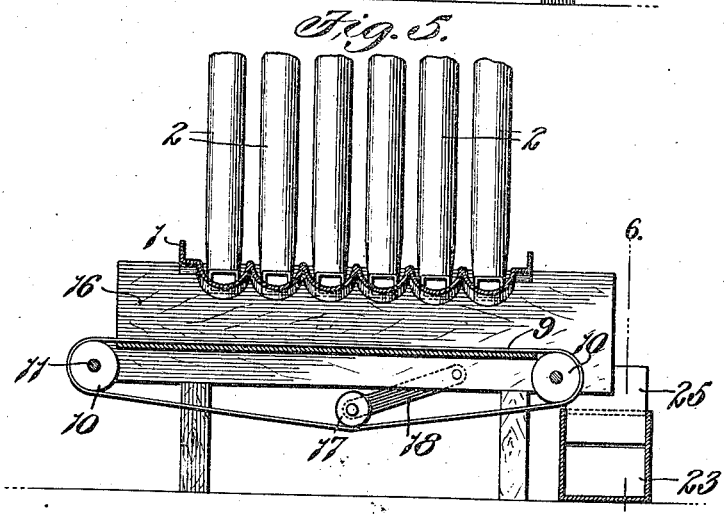
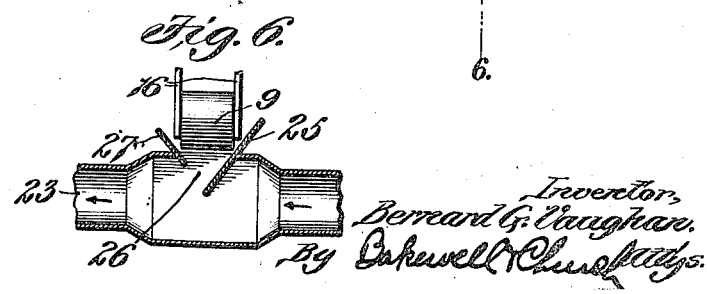

UNITED STATES PATENT OFFICE.

BERNARD GEORGE VAUGHAN, OF JOLIET, ILLINOIS, ASSIGNOR TO NATIONAL MATCH COMPANY, OF JOLIET, ILLINOIS, A CORPORATION OF ILLINOIS.

MATCH-SPLINT-CONVEYING APPARATUS.

1,093,366.  Specification of Letters Patent.  Patented Apr. 14, 1914.

Application filed July 19, 1913. Serial No. 779,957.

*To all whom it may concern:*

Be it known that I, BERNARD G. VAUGHAN, a citizen of the United States, residing at Joliet, Illinois, have invented a certain new and useful Improvement in Match-Splint-Conveying Apparatus, of which the following is a full, clear, and exact description, such as will enable others skilled in the art to which it appertains to make and use the same.

This invention relates to an apparatus for conveying match-splints from a source of supply to individual machines which act on the splints, as, for example, machines that arrange the splints in an orderly manner preparatory to their introduction into the hoppers of the machines that apply the tips to the ends of the splints.

The main object of my invention is to provide an efficient match-splint-conveying apparatus of simple construction which is so designed that the supply of splints to one or all of the individual machines can be cut off at the will of the operators who control said individual machines and without liability of causing the splints to clog the conveying apparatus or be strewn over the floor of the factory in proximity to the point where they enter the conduits through which they are conveyed to the individual machines.

Other objects and desirable features of my invention will be hereinafter pointed out.

Figure 1 of the drawings is a side elevational view of a match-splint-conveying apparatus constructed in accordance with my invention; Fig. 2 is a top plan view of a portion of the apparatus showing the screen that distributes the splints over the troughs which deliver the splints to the conduits through which the splints are conveyed to the individual machines; Fig. 3 is a vertical sectional view taken on the line 3—3 of Fig. 2; Fig. 4 is a vertical sectional view taken on the line 4—4 of Fig. 1; Fig. 5 is a vertical transverse sectional view taken on the line 5—5 of Fig. 1; and Fig. 6 is a detail sectional view taken on the line 6—6 of Fig. 5.

Referring to the drawings which illustrate the preferred form of my invention, A designates a distributing device that distributes the splints over a plurality of inclined troughs 1 whose lower ends termi-nate in proximity to the lower ends of conduits 2 that lead to individual machines, not shown, that act on the splints, the apparatus herein shown being used for supplying match-splints to machines that remove dust and dirt from the splints and arrange the splints in an orderly manner preparatory to their introduction into the hoppers of the dipping machines that apply the tips to the splints. The distributing device A of the apparatus herein shown consists of a horizontally disposed rotatable screen journaled in uprights 3 and provided at one end with a gear 4 that meshes with a pinion 5 which is connected to a pulley 6 over which a drive-belt 7 passes. The match-splints are fed into the opposite end of the screen A, either manually or by some suitable mechanical means, through a chute 8 that projects through an opening in the end of the screen, as shown in Fig. 4. The inclined troughs 1 may be of any preferred cross sectional shape, those herein shown being substantially semi-circular-shaped, as shown in Fig. 4, and the lower ends of said troughs are spaced away slightly from the lower ends of the conduits 2, as shown in Figs. 1 and 3, so as to permit the splints to pass from the troughs 1 onto the conveyer 9 under certain conditions, namely, when the suction is cut off in the conduits 2, as herein described. The conveyer 9 of the apparatus herein shown consists of an endless belt, as shown in Fig. 5, arranged below the lower ends of the troughs 1 and the conduits 2 and extending transversely of same, said belt being mounted on pulleys 10, one of which is connected to a counter-shaft 11 provided with a pulley 12 that is driven by a belt 13 which passes around a pulley 14 connected to the shaft 15 of the drum A, as shown in Figs. 1 and 4, so as to insure movement of the conveyer 9 whenever the screen A is rotating. Vertically disposed retaining walls 16 extend longitudinally of the conveyer 9 at each side of same, as shown in Fig. 1, so as to prevent the splints from falling off the conveyer, and a belt-tightening device such, for example, as a pulley 17 mounted on a pivotal arm 18, is provided for keeping the top side of the conveyer 9 taut.

Each of the conduits 2 leads to a vacuum chamber 20 from which the air is exhausted by means of a fan 21, as shown in Fig. 1, said vacuum chamber 20 being so designed that the match-splints that are sucked into same through the conduit 2 will drop through the discharge opening at the lower end of said chamber into a chute 22 that leads to the machine, not shown, in which the splints are to be operated on. Each of the conduits 2 is provided with a valve 2ª, and whenever the operator in charge of the machine to which the splints are being supplied, desires to cut off the supply of splints he closes the valve 2ª so as to cut off the suction in the conduit 2. Thereafter, the splints that travel down the inclined trough 1 that coöperates with that particular conduit 2, will drop from the lower end of said trough onto the conveyer 9 and be carried by said conveyer into a blast pipe 23 which leads upwardly and discharges into the chute 8 at one end of the screen A, as shown in Figs. 1, 2, 3 and 4, a blast being created in the pipe 23 by means of a blower 24, shown in Fig. 1. The blast pipe 23 is enlarged at the point where the splints are discharged into same from the conveyer 9, as shown in Fig. 6, and an inclined deflector 25 is arranged in the enlarged portion of said blast pipe so as to prevent the air which is forced through said pipe from escaping through the splint-receiving opening 26 in the upper side of said blast pipe, said deflector 25 being so arranged that the cross sectional area of the blast pipe 23 is approximately the same at the point where the splints enter same as at the other portions of said pipe. I also prefer to arrange a guard 27 in the pipe 23 at the opposite side of the splint-receiving opening 26, said guard 27 being inclined in an opposite direction to the deflector 25, as shown in Fig. 6. The splints that fall downwardly onto the conveyer 9 from the supply troughs 1, are carried transversely of the apparatus and discharged into the blast pipe 23 through which they are forced in the direction indicated by the arrows in Fig. 1 back into the receiving chute 8 of the screen A. Consequently, the apparatus will not become clogged or the floor in the vicinity of the apparatus will not be strewn with match-splints whenever one or all of the conduits 2 are closed owing to the fact that the splints which are discharged from the trough 1 that coöperates with the closed conduit 2, are carried by the conveyer 9 and the blast pipe 23 back into the distributing screen A. As soon as the conduit 2 that has been closed is opened the splints which travel down the trough 1 that coöperates with said conduit, will be sucked up through said conduit 2 into the vacuum chamber 20 of said conduit and will then pass from said vacuum chamber into the chute 22 that supplies the particular machine with which said conduit coöperates.

An apparatus of the construction above-described enables match-splints to be conveyed rapidly and economically from one part of the factory to a remote part of the factory in which are located machines that perform some operation on the splints; any desired number of machines can be supplied with match-splints from one point of supply; the supply of splints to the individual machines can be cut off or resumed at the will of the operators in charge of said machines; and when the supply of splints to one or more of the individual machines is cut off there is no liability of the conveying apparatus becoming clogged or of the splints becoming strewn over the floor at the point where the splints are fed into the conveying conduits 2.

While I have stated that the apparatus herein shown is used for conveying match-splints to machines that clean and arrange the splints in an orderly manner preparatory to their introduction into the hoppers of the dipping machines, it will, of course, be understood that my improved apparatus may be used for various other purposes, and while I have herein illustrated and described one specific embodiment of my invention I do not wish it to be understood that the invention is limited to an apparatus of the exact construction herein shown, for my broad idea consists in a match-splint-conveying apparatus provided with suction conduits that lead to individual machines to which the splints are to be supplied, distributing means for supplying splints to the receiving ends of said conduits, and means for causing the splints that are intended for a particular suction conduit to circulate through said distributing means when said particular conduit is closed or rendered inoperative, the apparatus being so designed that one or all of the suction conduits can be cut off or closed at the will of the operators in charge of the machines to which the splints are being supplied.

Having thus described my invention, what I claim as new and desire to secure by Letters Patent is:

1. A match-splint-conveying apparatus comprising pneumatic conduits that lead from a common or central point to individual machines to which splints are to be supplied, a distributing means for supplying splints to said conduits, individual means for rendering each of said conduits inoperative, and means whereby the closing or rendering inoperative of one or more of said conduits will cause the splints intended for same to be conveyed back to said distributing means.

2. A match-splint-conveying apparatus comprising conduits that lead from a common point to individual machines to which match-splints are to be supplied, a continuously operating delivering means for supplying splints to said conduits, a means coöperating with each of said conduits for cutting off the flow of splints through same, and means comprising a mechanically-operated conveyer and a blast pipe for causing the splints that are intended for a particular conduit to be conveyed back to said delivering means when said conduit is closed or rendered inoperative.

3. A match-splint-conveying apparatus comprising a plurality of conduits, each of which coöperates with an individual machine to which match-splints are to be supplied, means for creating a suction in said conduits so as to draw splints through same, means coöperating with each conduit for cutting off the suction in same, a delivering means common to all of said conduits for supplying match-splints to same, and means for conveying back to said delivering means the splints that are intended for a conduit which has been rendered inoperative.

4. In a match-splint-conveying apparatus, a plurality of suction conduits that lead from a central or common point to machines to which splints are to be supplied, means for rendering said conduits inoperative individually, a match-splint-supplying means arranged in proximity to the receiving ends of said conduits for holding match-splints that are adapted to be sucked into said conduits, and a conveying means for receiving splints from said supplying means when one or more of said conduits are rendered inoperative.

5. In a match-splint-conveying apparatus, a plurality of suction conduits that lead from a central or common point to machines to which splints are to be supplied, means for rendering said conduits inoperative individually, a match-splint-supplying means arranged in proximity to the receiving ends of said conduits for holding match-splints that are adapted to be sucked into said conduits, and a conveying means for receiving splints from said supplying means when one or more of said conduits are rendered inoperative, said conveying means being so designed that the splints received by same are conducted back to said supplying means.

6. In a match-splint-conveying apparatus, a plurality of suction conduits that lead from a central or common point to machines to which splints are to be supplied, means for rendering said conduits inoperative individually, match-splint-supplying means arranged in proximity to the receiving ends of said conduits for holding match-splints that are adapted to be sucked into said conduits, a conveyer onto which splints pass from said supplying means when one or more of said conduits are rendered inoperative, and means for carrying the splints received by said conveyer back to said supplying means.

7. In a match-splint-conveying apparatus, an inclined supporting means for receiving match-splints from a source of supply, suction conduits having their receiving ends terminating in proximity to said supporting means, means coöperating with each conduit for cutting off the suction in same, a conveyer arranged at the lower end of said supporting means for receiving splints that are not sucked into said conduits, and pneumatic means for returning the splints received by said conveyer back to the source of supply.

8. In a match-splint-conveying apparatus, an inclined supporting means for holding match-splints, suction conduits having their receiving ends terminating in proximity to said supporting means, a conveyer arranged at the lower end of said supporting means, means coöperating with each conduit for cutting off the suction in same, a distributing device for distributing match-splints over said inclined supporting means, and means for conducting the splints from said conveyer back to said distributing device.

9. A match-splint-conveying apparatus comprising a plurality of conduits which are open at one end, a vacuum chamber coöperating with each of said conduits for creating a suction in same, a plurality of inclined troughs terminating opposite the open ends of said conduits, means for distributing match-splints over said troughs, means in each of said conduits for cutting off the suction in same, and means coöperating with each of said conduits for receiving and conveying back to said distributing means the splints that are discharged from those troughs whose coöperating conduits are closed or inoperative.

In testimony whereof I hereunto affix my signature in the presence of two witnesses, this 14th day of July 1913.

BERNARD GEORGE VAUGHAN.

Witnesses:
 HENRY LESER,
 LEO MICHAEL HERKERT.